US012120198B2

(12) United States Patent
Bennet et al.

(10) Patent No.: US 12,120,198 B2
(45) Date of Patent: *Oct. 15, 2024

(54) SYSTEMS FOR PLATFORM-INDEPENDENT APPLICATION PUBLISHING TO A WEB CONTAINER

(71) Applicant: Rocket Software Technologies, Inc., Waltham, MA (US)

(72) Inventors: Gabriel Bennet, Nice (FR); Braulio Megías, Barcelona (ES)

(73) Assignee: Rocket Software Technologies, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,654

(22) Filed: Dec. 28, 2022

(65) Prior Publication Data

US 2023/0136034 A1 May 4, 2023

Related U.S. Application Data

(63) Continuation of application No. 17/518,245, filed on Nov. 3, 2021, which is a continuation-in-part of (Continued)

(51) Int. Cl.
*H04L 67/567* (2022.01)
*G06F 9/445* (2018.01)
*G06F 9/455* (2018.01)
*H04L 67/00* (2022.01)
*H04L 67/02* (2022.01)
(Continued)

(52) U.S. Cl.
CPC ........ *H04L 67/567* (2022.05); *G06F 9/44526* (2013.01); *G06F 9/45529* (2013.01); *H04L 67/02* (2013.01); *H04L 67/131* (2022.05); *H04L 67/141* (2013.01); *H04L 67/34* (2013.01); *G06F 9/4451* (2013.01)

(58) Field of Classification Search
CPC ..... H04L 67/567; H04L 67/131; H04L 67/02; H04L 67/141; H04L 67/34; G06F 9/44526; G06F 9/45529; G06F 9/4451
See application file for complete search history.

(56) References Cited

U.S. PATENT DOCUMENTS 9,535,560 B1 * 1/2017 Kominac ................ H04L 67/02
10,812,611 B2 10/2020 Bennet et al.
(Continued)

*Primary Examiner* — Normin Abedin
(74) *Attorney, Agent, or Firm* — Danielson Legal LLC

(57) ABSTRACT

Provided are computer-implemented methods and systems for publishing an application to a web container. An example method for publishing an application to a web container may include establishing a channel of communication with a user device associated with an end user. The method may further include embedding a web container into a web portal associated with a plurality of applications. The method may include executing an application in a user session associated with the end user. The method may further include capturing images of a virtual screen associated with the application executed on the application server. After the capture, the method may continue with sending the images to the web container of the web portal running in a web browser of the user device. The web container may publish the images to the web browser to display the application as part of the web portal in the web browser.

20 Claims, 6 Drawing Sheets

Related U.S. Application Data application No. 17/073,084, filed on Oct. 16, 2020, now Pat. No. 11,172,042, which is a continuation of application No. 15/858,528, filed on Dec. 29, 2017, now Pat. No. 10,812,611.

(51) Int. Cl.
  *H04L 67/131* (2022.01)
  *H04L 67/141* (2022.01)

(56) References Cited

U.S. PATENT DOCUMENTS

| | | | |
|---|---|---|---|
| 11,172,042 B2 | 11/2021 | Bennet et al. | |
| 11,611,633 B2 | 3/2023 | Bennet et al. | |
| 2007/0180367 A1* | 8/2007 | Chiang | G06F 16/9577 707/E17.121 |
| 2011/0078708 A1* | 3/2011 | Dokovski | G06F 9/545 719/329 |
| 2012/0010995 A1* | 1/2012 | Skirpa | G06F 16/9577 705/14.49 |
| 2013/0174028 A1 | 7/2013 | Grossman et al. | |
| 2014/0195675 A1* | 7/2014 | Silver | H04L 65/611 709/224 |
| 2015/0012478 A1* | 1/2015 | Mohammad | G06F 16/254 707/602 |
| 2015/0128105 A1 | 5/2015 | Sethi et al. | |
| 2016/0092339 A1* | 3/2016 | Straub | G06F 9/44521 717/124 |
| 2016/0092348 A1* | 3/2016 | Straub | G06F 8/61 717/124 |
| 2016/0267060 A1 | 9/2016 | Skirpa et al. | |
| 2017/0048339 A1* | 2/2017 | Straub | G06F 16/2379 |
| 2017/0068395 A1 | 3/2017 | Massoudi | |
| 2017/0339564 A1 | 11/2017 | Momchilov et al. | |
| 2020/0133982 A1 | 4/2020 | Thangeswaran et al. | |
| 2021/0037110 A1 | 2/2021 | Bennet et al. | |
| 2022/0060558 A1 | 2/2022 | Bennet et al. | |

* cited by examiner

SYSTEMS FOR PLATFORM-INDEPENDENT APPLICATION PUBLISHING TO A WEB CONTAINER

CROSS-REFERENCE TO RELATED APPLICATIONS

This application is a continuation of U.S. patent application Ser. No. 17/518,245, now U.S. Pat. No. 11,611,633, filed on Nov. 3, 2021, which is a continuation-in-part of U.S. patent application Ser. No. 17/073,084, filed on Oct. 16, 2020, now U.S. Pat. No. 11,172,042, issued Nov. 9, 2021, which is a continuation of U.S. patent application Ser. No. 15/858,528, filed on Dec. 29, 2017, now U.S. Pat. No. 10,812,611, issued Oct. 20, 2020. All of the aforementioned disclosures are hereby incorporated by reference herein in their entireties including all references cited therein.

FIELD

This application relates generally to data processing and, more specifically, to systems and methods for platform-independent application publishing to a personalized front-end interface by encapsulating published content into a container.

BACKGROUND

Web or cloud-based applications have gained widespread popularity. Publication of an application to a web browser typically uses a combination of server and client-side technologies. While the backend application server provides the heavy lifting for the core functionality of the application, the web browser and server-side scripts render the application's user interface on the client device.

Streaming of an application to an end-user device is becoming popular because such streaming does not require deploying any agent on the end-user device. However, conditions for such streaming typically depend on the operating system of the end-user device, as well as on functionalities of the web browser of the end-user device.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are computer-implemented methods and systems for publishing of an application to an end-user device. In some example embodiments, a method for publishing of an application to a user device may include establishing, by an application server, a channel of communication with a user device associated with an end user. The method may further include embedding, by the application server, a web container into a web portal. The web portal may be associated with a plurality of applications. The method may further include executing, by the application server, an application of the plurality of applications in a user session associated with the end user. The method may further include capturing, by a server-side agent running on the application server, one or more images of a virtual screen associated with the application executed on the application server. The method may continue with sending, by the server-side agent, the one or more images to the web container of the web portal. The web portal may run in a web browser of the user device. The web container may publish the one or more images of the virtual screen associated with the application to the web browser to display the application as part of the web portal in the web browser. The publishing may include rendering the application by the web container of the web browser as part of a personalized front-end interface associated with the end user. The application may be platform-independent of the user device.

In some example embodiments, a system for publishing of an application to a web container may include an application server, a server-side agent, and a web container. The application server may be configured to establish a channel of communication with a user device associated with an end user. The application server may be further configured to embed a web container into a web portal. The web portal may be associated with a plurality of applications. The application server may execute an application of the plurality of applications in a user session associated with the end user. The server-side agent may be configured to capture one or more images of a virtual screen associated with the application executed on the application server and send the one or more images to the web container of the web portal. The web portal may be running in a web browser of the user device. The web container may publish the one or more images of the virtual screen associated with the application to the web browser to display the application as part of the web portal in the web browser. The publishing of the application may include rendering the application by the web browser as part of a personalized front-end interface associated with the end user. The application may be platform-independent of the user device.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Example embodiments are illustrated by way of example and not limitation in the figures of the accompanying drawings, in which like references indicate similar elements.

DETAILED DESCRIPTION

Figure 1:
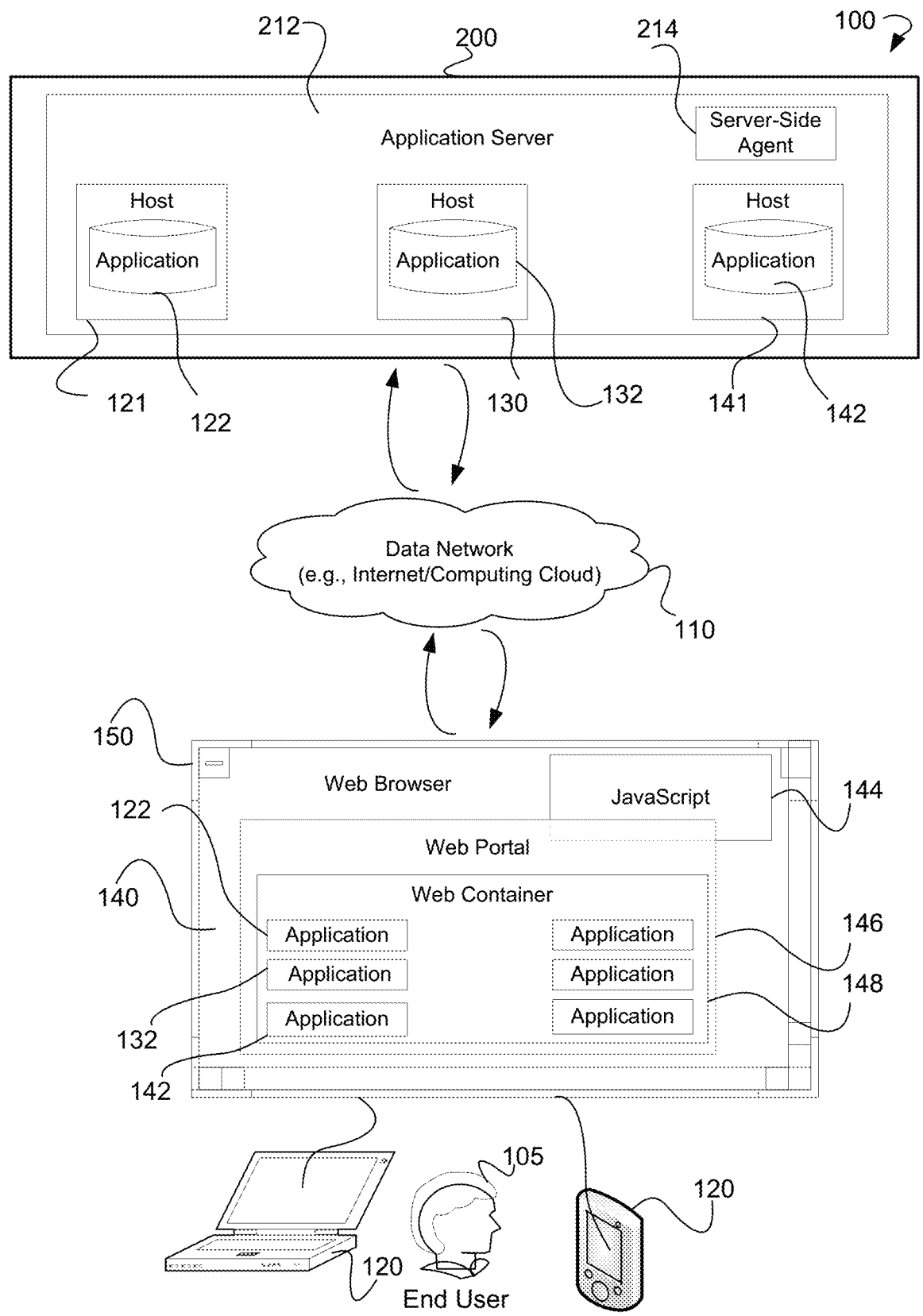
FIG. 1 illustrates an environment within which methods and systems for publishing an application to a web container can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Provided are computer-implemented methods and systems for publishing an application to a web container. According to these methods and systems, the application (e.g., a native Windows application) may be running on an application server. An end-user device, also referred herein to as a client device or a user device, may have a web browser configured to communicate with the application server via a network. A network session associated with the application can be established between the client device and the application server. The network session may be a Hypertext Transfer Protocol (HTTP) session. The end user may be logged into a web portal associated with the application server. The web portal may be a collaborative platform for a plurality of applications.

The web portal may have a web container embedded into the web portal. The web container may include a code, such as a JavaScript code embedded into the web portal. The web container may be configured to provide a required runtime environment for the applications in the web browser. Additionally, the web container may manage life cycles of the applications hosted on the application server, provide storage mechanisms for application preferences, and receive requests from the web portal to execute requests on the applications hosted by the application server.

Upon initiation of the network session between the user device and the application server, the application server can execute the application in the network session. The application server may include a server-side agent running on the application server. The server-side agent may be configured to capture a virtual screen associated with the web application running on the application server. Capturing the virtual screen may include capturing video frames shown on the virtual screen associated with the web application. The server-side agent may send the captured images of the virtual screen to the web browser of the user device.

On the user side, the web container of the web portal running in the web browser may receive images from the server-side agent. Upon receipt of the images, the web container may publish the images of the virtual screen associated with the application to the web browser to display the application as part of the web portal in the web browser. Specifically, the application can be published by rendering the application inside the web container of the web browser as part of the web portal.

Therefore, the application can be published by the web browser of the client device inside the web container embedded into the web portal, while the application can be platform-independent of the web browser. In other words, functionalities of the client device are not used for publishing the application and, thus, the application is platform-independent of the user device, i.e., the application does not depend on characteristics of the client device, such as an operating system, a type or a version of software running on the client device, and so forth. It should be understood that the technology described herein is not limited to a single application and, in some example embodiments, a plurality of applications can be simultaneously published to the web container of the web portal running in the web browser of the client device. This plurality of applications can be, for example, a group of web portal applications selected by the end user.

Thus, with the help of a web browser and a script (e.g., JavaScript), i.e., the web container embedded to the web portal and running on the web browser, a client device may act as a remote terminal for viewing a virtual screen of an application published inside the web container of the web portal without having the application server to publish the application to the web browser directly. Therefore, only a script (e.g., JavaScript) running on the web browser is needed for viewing the virtual screen of the application of the web portal on the client device, irrespective of the functionalities of the client device or the web browser and types of applications.

Applications can be delivered independently of the operating system that hosts the applications through an HTML5-compliant protocol. A video stream associated with the application, i.e., HTML5 stream, can be published to any web portal via a web container embedded into the web portal without requiring any agent, i.e., any specific software, deployed on the end-user device and independent of the end-user device.

In one example embodiment, the web container may be embedded into a portlet or a widget, which may be embedded into the web portal. Specifically, the portlet or the widget may be incorporated into enterprise workspaces and portals, such as Java Portlet specification (JSR286) compliant portals, OpenText, Sharepoint, and so forth. In example embodiments, the system and methods described herein may be implemented in any web portals of an enterprise, for example, those using a JavaScript Object Notation (JSON) technology, as well as in any portlets, widgets, or web components, because the web container may be a JavaScript web container completely independent of any functionalities of the web portal or user device, types of technologies used by the web portal or the user device, and types of applications of the web portal.

Thus, all types of applications can be delivered remotely without an agent of a user device, thereby reducing the capital expenditures and operating expenses on the application delivery. Moreover, users can access applications from any user devices and in the same web portals that the users conventionally use to access their content and collaborate with their colleagues. Therefore, the user experience and productivity may be increased.

Referring now to the drawings, FIG. 1 illustrates an environment 100 within which methods and systems for publishing an application to a web container can be implemented. The environment 100 may include a data network 110 (e.g., an Internet or a computing cloud), an end user 105, a client device 120 also referred herein to as a user device and shown as a laptop or a smartphone associated with the end user 105, and a system 200 for publishing an application to a web container. The system 200 may include an application server 212 and a server-side agent 214 associated with the application server 212. The application server 212 may have a plurality of hosts 121, 130, 141 for a plurality of web applications 122, 132, 142. The client device 120 may include a user interface 150. Furthermore, a web browser 140 may be running on the client device 120 and displayed using the user interface 150. The web browser 140 may communicate with the application server 212 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The web browser 140 may use JavaScript 144 to display a web page associated with a web portal 146. The web portal 146 may have a web container 148 embedded into the web portal 146. The web portal 146 may include a plurality of applications 122, 132, 142 running on the application server 212. Upon selection of one of the applications 122, 132, 142, by the end user 105, the application server 212 may execute the selected one of the applications 122, 132, 142 and deliver content associated with the selected one of the applications 122, 132, 142 of the web portal 146 to the web container 148 of web browser 140 of the client device 120.

Figure 2:
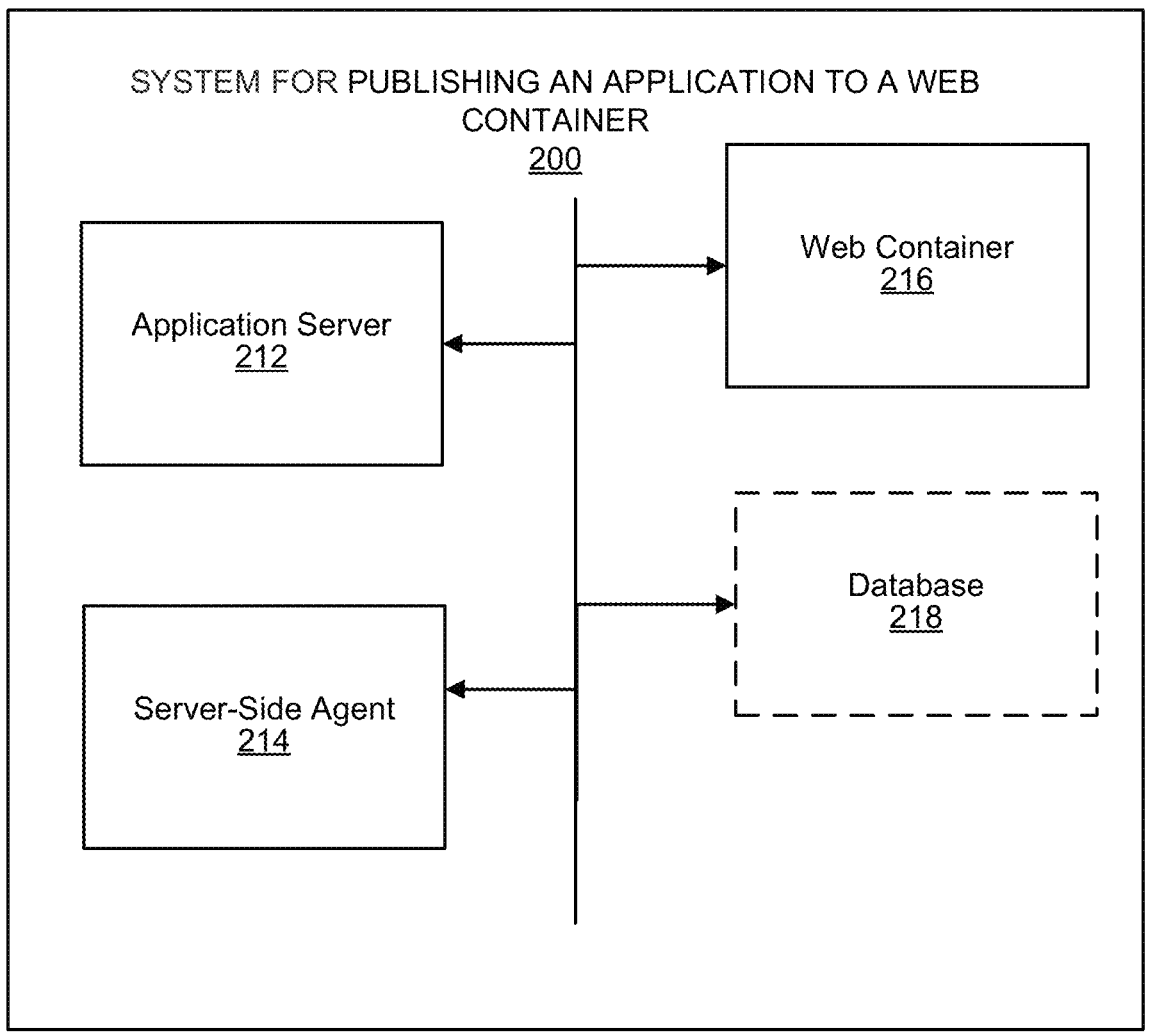
FIG. 2 is a block diagram of a system for publishing an application to a web container, according to an example embodiment.

FIG. 2 shows a block diagram illustrating various modules of a system 200 for publishing an application to a web container, according to an example embodiment. The system 200 may include an application server 212, a server-side agent 214, a web container 216, and, optionally, a database 218. The database 218 may store data associated with the application server 212, the server-side agent 214, the web container 216, and a plurality of applications running on the application server 212. The operations performed by each of the modules of the system 200 are described in more detail below with reference to FIGS. 3 and 4.

Figure 3:
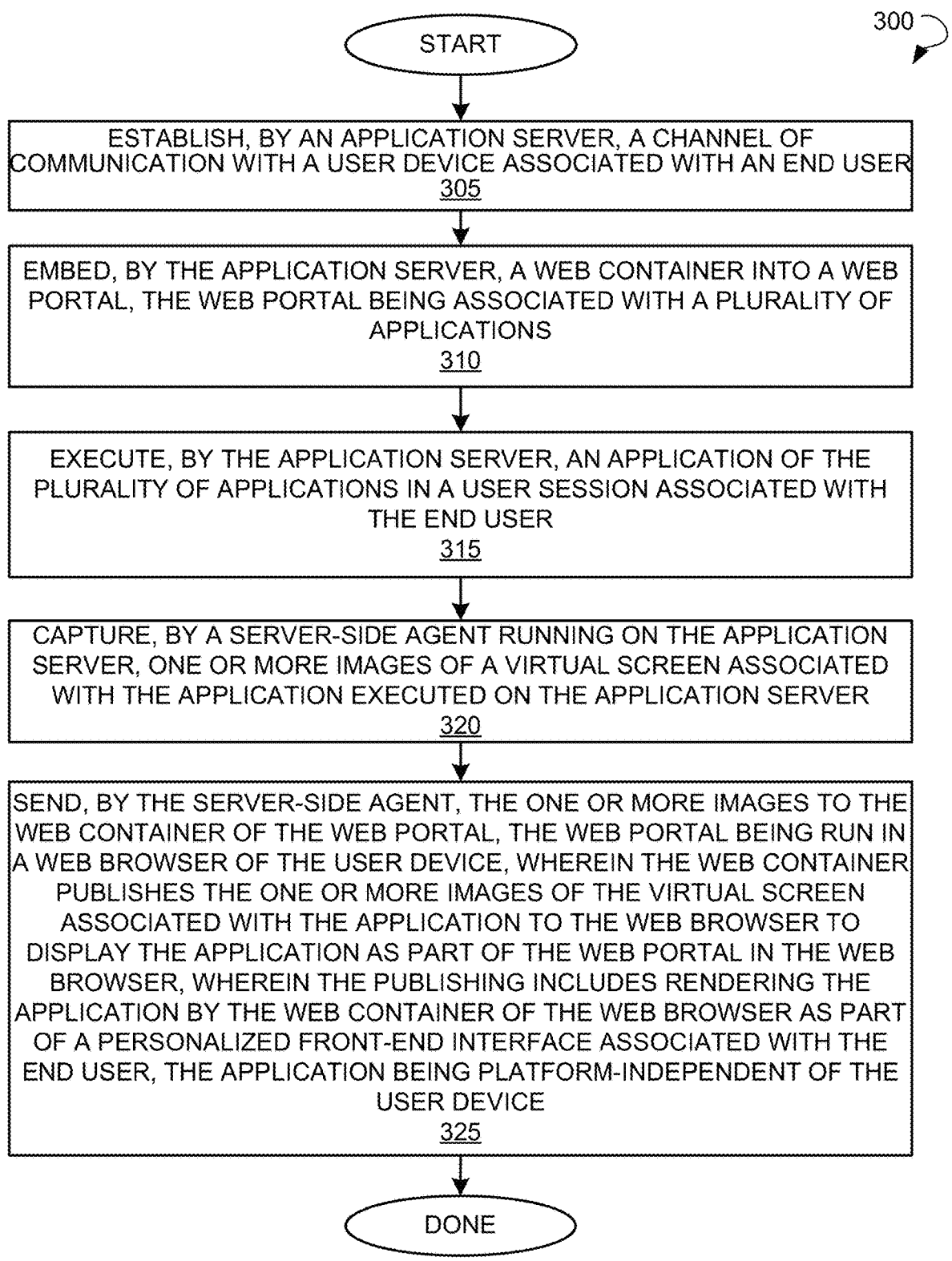
FIG. 3 illustrates a flow chart of a method for publishing an application to a web container, according to an example embodiment.

FIG. 3 shows a process flow diagram of a method 300 for publishing an application to a web container, according to an example embodiment. In some embodiments, the operations can be combined, performed in parallel, or performed in a different order. The method 300 may also include additional or fewer operations than those illustrated. The method 300 can be performed by processing logic comprising hardware (e.g., decision making logic, dedicated logic, programmable logic, and microcode), software (such as software run on a general-purpose computer system or a dedicated machine), or a combination of both.

The method 300 may commence with establishing, by an application server, a channel of communication with a user device associated with an end user at operation 305. In an example embodiment, the channel of communication may include a Hypertext Transfer Protocol (HTTP) session. The method 300 may further include embedding, by the application server, a web container into a web portal at operation 310. The web portal may be associated with a plurality of applications. The web container may be configured to provide a runtime environment for applications, manage life cycles of the applications, provide storage mechanisms for application preferences, and receive requests from the web portal to execute requests on the applications hosted by the web container.

At operation 315, the method 300 can continue with executing, by the application server, an application of the plurality of applications in a user session associated with the end user. Upon execution of the application on the application server, a server-side agent running on the application server may capture one or more images of a virtual screen associated with the application executed on the application server at operation 320. The captured one or more images may include video frames shown on the virtual screen associated with the web application. The one or more images may be captured, for example, in Joint Photographic Experts Group (JPEG) format, portable network graphics (PNG) format, or any other image format.

The method 300 may continue with sending, by the server-side agent, the one or more images to the web container of the web portal at operation 325. The web portal may be running in a web browser of the user device. The web container may include an HTML5 canvas element of the web portal. The web container may receive the one or more images of the virtual screen associated with the application sent by the server-side agent and publish the one or more images to the web browser. Thereafter, the application may be displayed as part of the web portal in the web browser. Specifically, the publishing may include rendering the application by the web container of the web browser as part of a personalized front-end interface associated with the end user, the application being platform-independent of the user device. In an example embodiment, the web container displays the application as one of HTML, JavaScript, or CSS code embedded into the web portal.

In an example embodiment, the application may be rendered using HTML. In another example embodiment, the application may be rendered using a script running inside the web browser of the user device. The script may include JavaScript. The application may be platform-independent of the user device, i.e., does not depend on the operating system or functionalities of the user device.

In an example embodiment, the end user may be registered with the web portal and have a user profile associated with the web portal. The application may be published to web container of the web browser on the user device while the end user is logged into the web portal. The web portal may be customized for the end user. The customization may be performed based on the user profile, user preferences provided or selected by the user, personal data of the end user, such as data relating to activities of the end user on the web portal or in respect of the applications of the web portal, personal data of the end user collected by third parties, and so forth. The web portal may be compliant with HTML5 specifications. The application may be published to a Java Portlet Request or Sharepoint compliant portal through the web container. In an example embodiment, the web container may be agnostic to an implementation of the user device.

In an example embodiment, the web portal may include a collaborative platform for a plurality of applications. The collaborative platform can include a workspace having a plurality of applications executable on the application server. The plurality of applications may be served through a proxy in the collaborative platform. The web container may be configured to simultaneously publish the plurality of applications to the web portal in the web browser of the user device.

Figure 4:
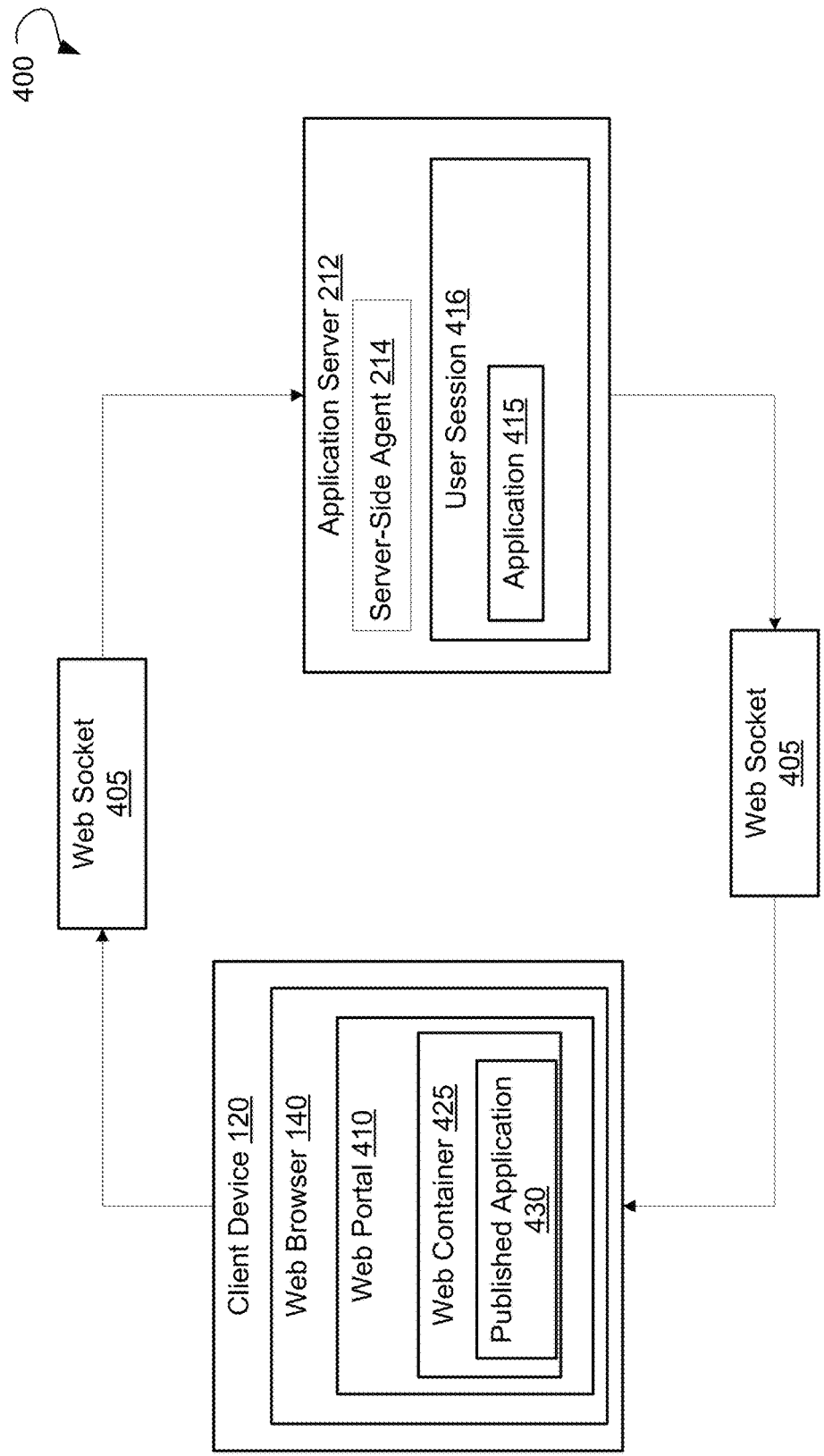
FIG. 4 is a block diagram illustrating an interaction between a user device and an application server in the course of publishing of a web portal to a web browser of a user device, according to an example embodiment.

FIG. 4 is a block diagram 400 illustrating interactions between a client device and an application server during publishing of a web portal to a web browser of the client device, according to an example embodiment. A client device 120 may be associated with an end user (not shown) and may include a web browser 140. A channel of communication may be established between the client device 120 and an application server 212. The client device 120 and the application server 212 may communicate via a web socket 405. The web socket 405 is a bidirectional communication technology for applications that operate over a single socket and is executed via a JavaScript interface in HTML5 compliant web browsers. The web socket 405 may facilitate an HTTP connection between a web browser 140 and the application server 212. The web socket 405 can enable the web browser 140 to maintain a channel of communication with the application server 212 and to exchange data between the web browser 140 and the application server 212.

A web portal 410 may be associated with the application server 212 and may be displayed by the web browser 140. The application server 212 may execute an application 415 associated with the web portal 410 in a user session 416 associated with the end user. The application server 212 may have a server-side agent 214. The server-side agent 214 may capture images of a virtual screen showing the application 415 executed by the application server 212. The server-side agent 214 may send the captured images to a web container 425 embedded into the web portal 410. The web container 425 may receive content, i.e., images, associated with the application 415 executed by the application server 212 and render the application 415 as part of the web portal 410. Specifically, the web container 425 may render the application 415 as part of a personalized front-end interface associated with the end user. Therefore, the content associated with the application 415 may be rendered in the web browser 140 and may be shown as published application 430 to the end user.

The end user of the client device 120 may view the published application 430 in the web browser 140 of the client device 120. Additionally, the end user may provide a user action (not shown) using the web browser 140. The user action may include clicking the client device 120 with a mouse, entering user input via a keyboard, touching a touchscreen of the client device 120, providing user input via a voice or a gesture sensed by the client device 120, and so forth. The client device 120 can send the user action to the application server 212 via the web socket 405. The server-side agent 214 may be responsible for receiving the user action from the client device 120. The application server 212 may perform commands in response to the user action.

Figure 5:
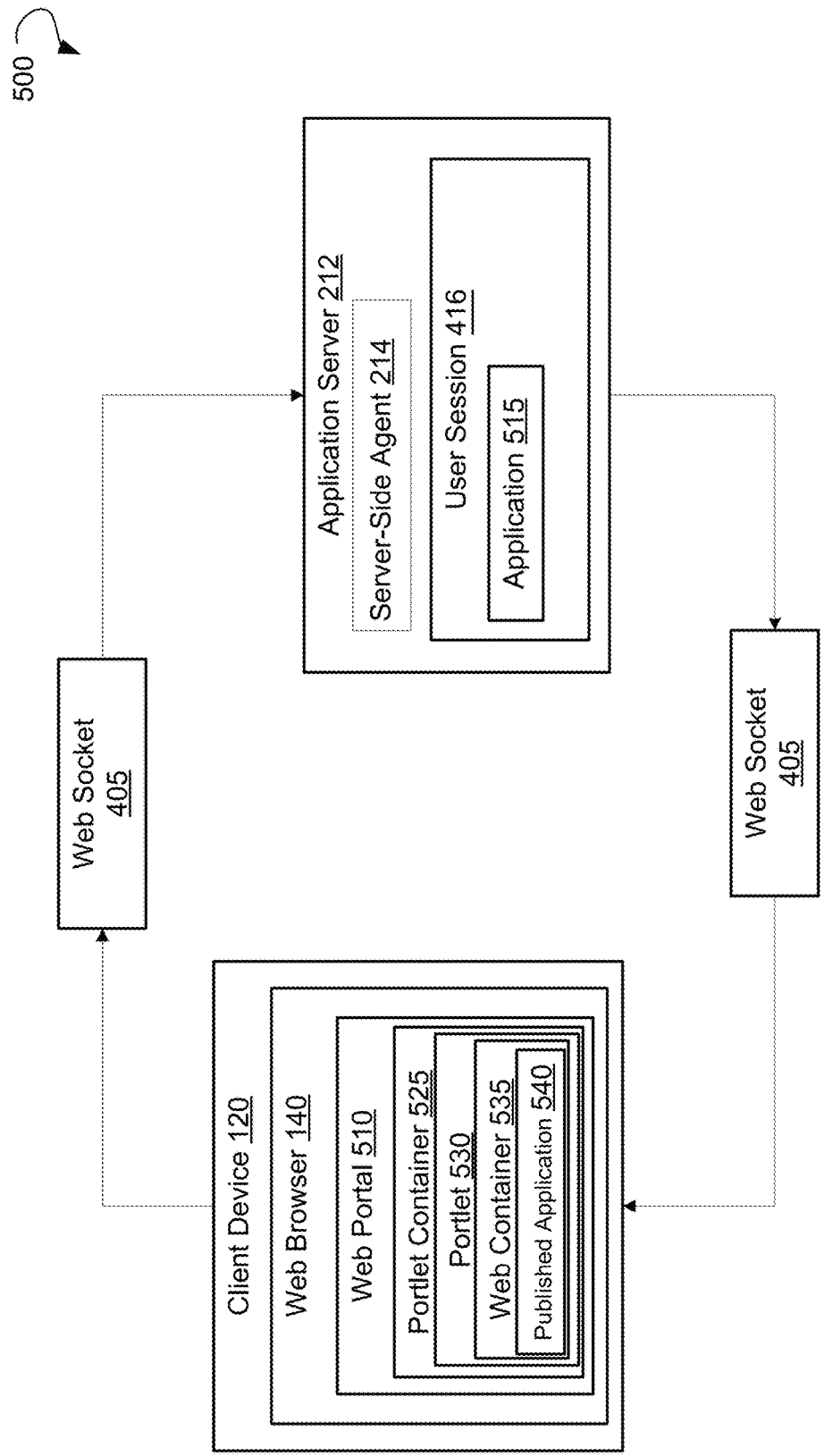
FIG. 5 is a block diagram illustrating an interaction between a user device and an application server in the course of publishing of a web portal having portlets to a web browser of a user device, according to an example embodiment.

FIG. 5 is a block diagram 500 illustrating interactions between a client device and an application server, when publishing a web portal having portlets, to a web browser of the client device, according to an example embodiment. A client device 120 may be associated with an end user (not shown) and may include a web browser 140. A channel of communication can be established between the client device 120 and an application server 212. The client device 120 and the application server 212 may communicate via a web socket 405.

A web portal 510 can be associated with the application server 212 and can be displayed by the web browser 140. The web portal 510 may include a portlet container 525. The portlet container 525 may include one or more portlets, such as a portlet 530. The portlet 530 may include a pluggable user interface software component that can be managed and displayed via the web portal 510. A web container 535 may be embedded into the web portal 510. In an example embodiment, the web container 535 may be embedded into the portlet 530 of the web portal 510.

The application server 212 may execute an application 515 associated with the web portal 510 in a user session 416 associated with the end user. The application server 212 may include a server-side agent 214. The server-side agent 214 may capture images of a virtual screen showing the application 515 executed by the application server 212. The server-side agent 214 may send the captured images to the web container 535 embedded into the web portal 510. The web container 535 may receive content, i.e., images, associated with the application 515 executed by the application server 212 and render the application 515 as part of the web portal 510. Specifically, the web container 535 may render the application 515 as part of the portlet 530 of the web portal 510. Therefore, the content associated with the application 515 may be rendered in the web browser 140 and shown as published application 540 to the end user. The end user of the client device 120 may view the published application 540 in the web browser 140 of the client device 120.

Figure 6:
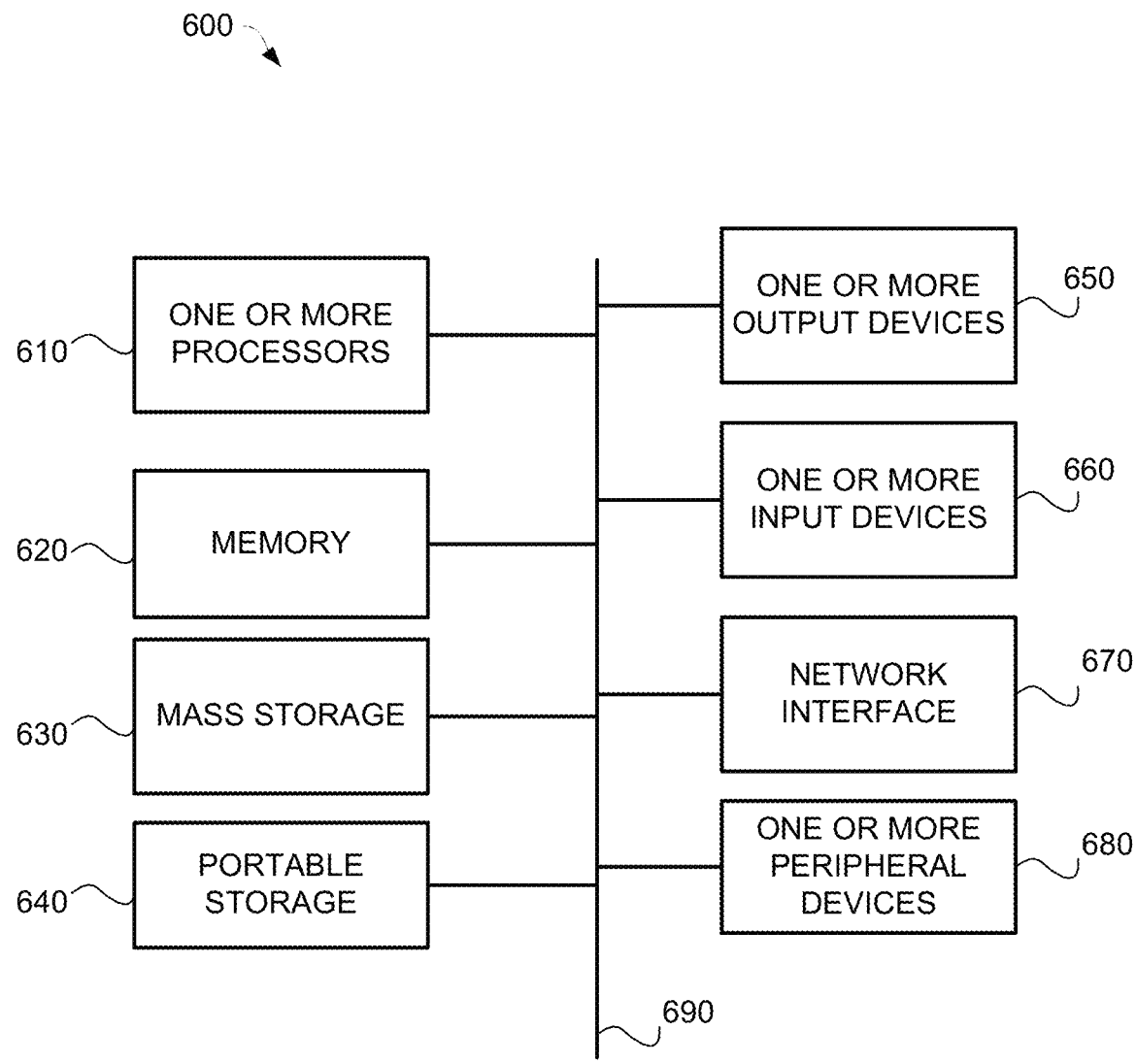
FIG. 6 is a computing system that can be used to implement a method for publishing an application to a web container, according to an example embodiment.

FIG. 6 illustrates an example computing system 600 used to implement embodiments described herein. The example computing system 600 of FIG. 6 may include one or more processors 610 and memory 620. Memory 620 may store, in part, instructions and data for execution by the one or more processors 610. Memory 620 can store the executable code when the example computing system 600 is in operation. The example computing system 600 of FIG. 6 may further include a mass storage 630, portable storage 640, one or more output devices 650, one or more input devices 660, a network interface 670, and one or more peripheral devices 680.

The components shown in FIG. 6 are depicted as being connected via a single bus 690. The components may be connected through one or more data transport means. The one or more processors 610 and memory 620 can be connected via a local microprocessor bus, and the mass storage 630, one or more peripheral devices 680, portable storage 640, and network interface 670 may be connected via one or more input/output buses.

Mass storage 630, which can be implemented with a magnetic disk drive or an optical disk drive, is a non-volatile storage device for storing data and instructions for use by a magnetic disk or an optical disk drive, which in turn, may be used by one or more processors 610. Mass storage 630 can store the system software for implementing embodiments described herein for purposes of loading that software into memory 620.

Portable storage 640 may operate in conjunction with a portable non-volatile storage medium, such as a compact disk (CD) or digital video disc (DVD), to input and output data and code to and from the computing system 600 of FIG. 6. The system software for implementing embodiments described herein may be stored on such a portable medium and input to the computing system 600 via the portable storage 640.

One or more input devices 660 provide a portion of a user interface. The one or more input devices 660 may include an alphanumeric keypad, such as a keyboard, for inputting alphanumeric and other information, or a pointing device, such as a mouse, a trackball, a stylus, or cursor direction keys. Additionally, the computing system 600 shown in FIG. 6 can include one or more output devices 650. Suitable one or more output devices 650 can include speakers, printers, network interfaces, and monitors.

Network interface 670 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 670 may include a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 680 may include any type of computer support device to add additional functionality to the computing system. The one or more peripheral devices 680 may include a modem or a router.

The components contained in the example computing system 600 of FIG. 6 are those typically found in computing systems that may be suitable for use with embodiments described herein and are intended to represent a broad category of such computer components that are well known in the art. Thus, the example computing system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, various embodiments of methods and systems for publishing an application to a web container have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method for publishing an application to a web container by an established channel of communication with a user device, the method comprising:

embedding, by an application server, a web container into at least one pluggable user interface software component of a web portal for a web browser at the user device, the web container comprising an HTML5 canvas element of the web portal, the web portal being associated with a plurality of applications;

executing, by the application server, an application of a plurality of applications in a user session associated with an end user associated with the user device, the application being platform-independent of the user device;

capturing, by a server-side agent running on the application server, one or more video frames of a virtual screen associated with the application executed on the application server; and sending, by the server-side agent, the one or more video frames of the virtual screen to the web container of the web portal, the user device acting as a remote terminal for viewing the one or more video frames of the virtual screen and the HTML5 canvas element.

2. The method of claim 1, wherein the web container is further configured to do at least one of the following: manage a life cycle of an application of the plurality of applications, provide storage mechanisms for application preferences and receive requests from the web portal to execute requests on the plurality of applications hosted by the web container.

3. The method of claim 1, wherein the one or more video frames of the virtual screen are captured in at least one of a Joint Photographic Experts Group (JPEG) format and portable network graphics (PNG) format.

4. The method of claim 1, wherein the channel of communication between the application server and the user device is for a Hypertext Transfer Protocol (HTTP) session.

5. The method of claim 1, wherein the application is rendered using at least one of the following: a Hypertext Markup Language (HTML), and a script running inside the web browser of the user device.

6. The method of claim 1, wherein the application is published to the web container of the web portal on the user device while the end user is logged into the web portal.

7. The method of claim 1, wherein the web portal is compliant with HTML5 specifications.

8. The method of claim 1, wherein the application is published to a Java Portlet Request or Sharepoint compliant portal via the web container.

9. The method of claim 1, wherein the web container is configured to display an executed application as one of HTML, JavaScript, or CSS code embedded into the web portal.

10. The method of claim 1, wherein the web container is configured to simultaneously publish the plurality of applications associated with the web portal to the web browser.

11. The method of claim 1, wherein the plurality of applications is served through a proxy in the web portal.

12. The method of claim 1, wherein the web portal is customized for the end user.

13. The method of claim 12, wherein the customization is performed based on at least one of a user profile, user preferences provided or selected by the end user, personal data of the end user, data relating to activities of the end user on the web portal, data relating to activities of the end user regarding one or more of the plurality of applications of the web portal, and personal data of the end user collected by third parties.

14. A system for publishing an application to a web container, the system comprising:
an application server comprising:
at least one processor;
at least one host, each of the at least one hosts hosting at least one web application coupled to a channel of communication with a user device; and
a memory storing processor-executable instructions, wherein the at least one processor is configured to implement the following operations upon executing the processor-executable instructions:
embed a web container into at least one pluggable user interface software component of a web portal for a web browser at the user device, the web container comprising an HTML5 canvas element of the web portal, the web portal being associated with a plurality of applications;
execute an application of a plurality of applications in a user session associated with an end user associated with the user device, the application being platform-independent of the user device;
capture one or more video frames of a virtual screen associated with the application executed on the application server; and
send the one or more video frames of the virtual screen to the web container of the web portal, the user device acting as a remote terminal for viewing the one or more video frames of the virtual screen and the HTML5 canvas element.

15. The system of claim 14, wherein the publishing includes rendering the one or more video frames of the virtual screen associated with the application by the web container as part of a personalized front-end interface associated with the end user.

16. The system of claim 14, wherein the application is rendered using one of the following: a Hypertext Markup Language (HTML) and a script running inside the web browser of the user device.

17. The system of claim 14, wherein the application is published to the web container of the web portal on the user device while the end user is logged into the web portal.

18. The system of claim 14, wherein the web portal is customized for the end user.

19. The system of claim 14,
wherein the web portal includes a collaborative platform for the plurality of applications, wherein the web container is configured to do at least one of the following: manage a life cycle of an application of the plurality of applications, and simultaneously publish the plurality of applications to the web browser.

20. A computer program product comprising a non-transitory computer useable storage device having a computer readable program for publishing an application to a web container by an established channel of communication with a user device, wherein the computer readable program when executed on an application server causes the application server to:
embed a web container into pluggable user interface software component of a web portal for a web browser at the user device, the web container comprising an HTML5 canvas element of the web portal, the web portal being associated with a plurality of applications;
execute an application of the plurality of applications in a user session associated with the end user associated with the user device, the application being platform-independent of the user device;
capture one or more video frames of a virtual screen associated with the application executed on the application server; and
send the one or more video frames of the virtual screen to the web container of the web portal, the user device acting as a remote terminal for viewing the one or more video frames of the virtual screen and the HTML5 canvas element.

* * * * *